United States Patent [19]

Gilgenbach

[11] Patent Number: 4,885,065
[45] Date of Patent: Dec. 5, 1989

[54] ELECTRON BEAM, ION BEAM, OR NEUTRAL PARTICLE BEAM INDUCED MODIFICATION OF OR ENHANCEMENT OF COMBUSTION REACTIONS

[75] Inventor: Ronald M. Gilgenbach, Ann Arbor, Mich.

[73] Assignee: The University of Michigan-Ann Arbor, Ann Arbor, Mich.

[21] Appl. No.: 55,611

[22] Filed: May 29, 1987

[51] Int. Cl.$^4$ .............................................. B01J 19/08
[52] U.S. Cl. .......................... 204/157.6; 204/157.63; 204/157.44; 204/157.4; 204/157.47; 204/157.5
[58] Field of Search ........... 204/157.4, 157.44, 157.47, 204/157.5, 157.52, 157.6, 157.63

[56] References Cited

U.S. PATENT DOCUMENTS

| | | | |
|---|---|---|---|
| 3,122,633 | 2/1964 | Stiegerwald | 250/49.5 |
| 3,676,249 | 7/1972 | Lemelson | 156/244 |
| 3,901,778 | 8/1975 | Machi | 204/157.44 |
| 3,933,434 | 1/1976 | Matovich | 23/252 R |
| 3,940,324 | 2/1976 | Abramson | 204/157.44 |
| 4,042,334 | 8/1977 | Matovich | 23/252 R |
| 4,138,298 | 2/1979 | Bobeth et al. | 204/159.12 |
| 4,172,776 | 10/1979 | Singelyn | 204/159.22 |
| 4,233,126 | 11/1980 | Garcia | 204/157.1 H |
| 4,343,687 | 8/1982 | Ronn | 204/157.1 H |
| 4,464,330 | 8/1984 | Speir et al. | 376/159 |
| 4,507,265 | 3/1985 | Higo et al. | 422/186 |
| 4,595,579 | 6/1986 | Prudhon et al. | 423/487 |
| 4,596,642 | 6/1986 | Higo et al. | 204/157.3 |

OTHER PUBLICATIONS

*Fifth Symposium (International) on Combustion*-Combustion in Engines and Combustion Kinetics, (1954), pub. 1955, pp. 569–582, "Effect of Atomic Radiation on the Combustion of Hydrocarbon Air Mixtures", Robert E. Cullen and Martin E. Gluckstein.
Draft paper to be published by S. W. Bidwell, R. A. Bosch, and R. M. Gilgenbach, pp. 1–53, (1988).
*Studies in Physical and Theoretical Chemistry* 14, by G. Földiak, (1981), pp. 7–59, "Radiation Chemistry of Hydrocarbons".
Poster Session paper 2V20 in Bulletin of the American Physical Society, 31, No. 9, p. 430, 1986.
R. M. Gilgenbach et al: "Intense Electron Beam Ignition of Combustible Gaseous Mixtures", Jun. 1–3, 1987.
Gilgenbach et al., *J. Appl. Phys.*, vol. 62, No. 6, Sep. 15, 1987.

*Primary Examiner*—John F. Niebling
*Assistant Examiner*—Ben C. Hsing
*Attorney, Agent, or Firm*—Oblon, Spivak, McClelland, Maier & Neustadt

[57] ABSTRACT

A process for modifying or enhancing a combustion reaction by injecting a particle beam into the combustion reaction, is disclosed.

21 Claims, 7 Drawing Sheets

IGNITION

IGNITION

ELECTRON BEAM, ION BEAM, OR NEUTRAL PARTICLE BEAM INDUCED MODIFICATION OF OR ENHANCEMENT OF COMBUSTION REACTIONS

The research leading to this invention was supported by the National Science Foundation under a Presidential Young Investigator Award, NSF ECS No. 8351837.

BACKGROUND OF THE INVENTION

1. Field of the Invention

The present invention relates to the enhancement of gas, liquid or solid combustion reactions and/or to driving gas, liquid, or solid combustion chemical reactions.

2. Discussion of the Background

Combustion reactions are found in many different areas. Combustion reactions are found in the generation of power, for example, in internal combustion engines, turbines, jet engines, in fossil fueled electric utility plants, etc. Combustion reactions are also found in pollution control, for example, in the burning of pollutants produced by industrial processes.

Combustion reactions are however unfortunately not perfectly efficient. This results in loss of part of the energy contained in fuels, or in incomplete pollution control. There are also limits on how lean a fuel-air mixture can be reliably ignited and burned.

Increased flame speed can increase the efficiency of combustion reactions and reduce pollution. As an example, in an internal combustion engine, higher flame speed in lean mixtures could lead to a higher efficiency, better fuel economy, and reduced pollution.

Many different approaches are being pursued to increase combustion efficiency, including increasing turbulence,[1] increasing the concentration of free radicals,[2,3] applying electric fields,[4] and microwaves.[5] Other approaches involve enhanced ignition such as plasma jet,[6] torch,[7] and laser ignition.[8,9] The direct injection of energetic particles, i.e., electrons, ions or neutral particles into a combustion chamber to stimulate combustion, to the inventor's knowledge, has however never been disclosed in the literature.

Numerous processes, including chemical and mechanical manufacturing processes, generate undesired pollutants. The optimal method of pollution control is to enhance the chemical reaction in such a way as to prevent the pollutants from being generated since such pollutants are difficult to deal with after they have been generated. Unfortunately, in most cases, this has so far not been possible.

Proposals have been made to filter effluent gases to remove pollutants, for example, by using a dust collector. Such approaches suffer from the fact that filtration systems are expensive, the filtration systems used are frequently incapable of completely removing the pollutants from effluent gases, and even if the pollutant is removed from an effluent gas, the problem of disposing of the pollutant remains.

It has been proposed that filtration of pollutants can be improved by irradiating effluent gases causing the polymerization of $SO_x$ and/or $NO_x$ contaminants contained therein to facilitate their removal. See Higo et al in U.S. Pat. Nos. 4,596,642 and 4,507,265. This approach however does not solve the problem of pollutant disposal since the $SO_x$ and/or $NO_x$ solids and/or mists collected still have to be disposed of. The Higo et al approach is also not fully satisfactory for the additional reason that the main object of both of these patents is to provide a complicated geometry to recover the polymerized pollutants.

Another area which has received attention is the development of systems promoting desired reactions. This is discussed for example by Matovich in U.S. Pat. Nos. 3,933,434 and 4,042,334. These two U.S. patents note that it would be useful to be able to carry out high temperature chemical reactions which heretofore have been impractical or only theoretically possible. A reactor is provided by these patents which utilizes radiation coupling as a thermal heat source. The reactor disclosed which uses electromagnetic radiation to heat a reaction is reportedly able to provide a thermal power density to the reaction site in excess of $10^4$ watts $cm^{-2}$.

The reactor provided by U.S. Pat. Nos. 3,933,434 and 4,042,334 addresses high temperature chemical reactions, and more specifically pyrolysis reactions. This reactor provides an annular envelope containing an inert fluid which is substantially transparent to radiation. At least one reactant is passed through the core of the envelope along a predetermined path substantially coincident with the envelope axis, with the reactants being confined within this envelope. After reactant flow has started, radiant energy is directed through the envelope to coincide with at least a portion of the path of the reactants. This causes the absorption of a sufficient radiant energy in the core to raise the temperature of the reactant to a level required to initiate the desired chemical reaction.

In using this reactor, heat is supplied by radiation coupling rather than by convection and/or conduction. The configuration of this reactor permits that the temperature of the reactant stream be independent of both the temperature of the reactor wall and the conditions of the reaction stream. Its disclosed application resides in promoting pyrolysis reactions, e.g., transforming methane to carbon and dihydrogen.

This reactor uses electromagnetic radiation having a wavelength of from 100 microns to $10^{-2}$ microns for heating a reaction without actually modifying it. It is based on using electromagnetic radiation which limits the power density available to influence the reaction, and the configuration of the reactor provided precludes adaptation to various other areas where reaction enhancement would be useful.

Matovich discloses that the term "radiation" used in his patents is intended to encompass all forms of radiation, including high-energy or impacting nuclear particles. However, Matovich states that he knows of no manner in which high-energy or impacting nuclear particles can be used in accordance with his invention, and rather that black body or other electromagnetic radiation, particularly of wavelengths ranging from about 100 microns of 0.01 microns, should be used in his reactor. Matovich's system therefore uses electromagnetic radiation, and, only provides a method for directing heat onto a pyrolysis reaction. It does not provide a system for modifying and/or enhancing chemical reactions, and no combustion processes are mentioned in these patents.

There is therefore a strongly felt need for a method which would permit modifying and/or enhancing combustion processes so that these processes can be controlled and/or rendered more efficient with concomittant pollution control. Such a method would have applications in enhancing the combustion of materials, such as, fuel in internal combustion engines, electricity generation, controlling pollution, and driving reactions which are otherwise not possible.

SUMMARY OF THE INVENTION

Accordingly, it is an object of this invention to provide a novel process for modifying or enhancing combustion reactions.

It is another object of this invention to provide a process for driving combustion reactions which otherwise do not occur.

It is another object of this invention to provide a process for igniting a combustible gaseous, liquid, or solid substance or mixture.

The inventor has now discovered that these objects and other objects which will become apparent from a reading of the description of the invention given here below are all satisfied by subjecting a combustion reaction, either immediately or during the combustion process, to particle beam radiation. The particle beam radiation used can be an electron beam, an ion beam, a neutral particle beam, or a combination of these. Each of these beams must have an energy of from $10^{-2}$ eV to $10^7$ eV and a current of from $10^{-7}$ Amperes to $10^7$ Amperes.

This invention also provides a novel injector plug/spark plug which can be used to either modify a chemical combustion reaction or drive a combustion reaction which is otherwise not possible. This injector plug/spark plug is designed to provide both the spark needed to initiate and maintain the combustion reaction and a stream of particles which are injected directly into the combustion process.

This invention also provides a novel injector plug. This particle beam injector plug provides a particle beam. It can be used in place of or in addition to a conventional spark plug. When used in conjunction with a conventional spark plug, the spark plug ignites the gaseous mixture while the particle beam injector plug injects a particle beam into the combustion chamber to promote more rapid flame speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying figures.

DETAILED DESCRIPTION OF THE PREFERRED EMBODIMENTS

The present invention provides a method for driving a combustion reaction by means of an electron beam, a ion beam, or a neutral particle beam. In this document, the terms electron beam, ion beam and neutral particle beam will be collectively referred to as "particle beam."

Ion beams which can be used in accordance with the present invention include, for example, beams of the following ions: $H^+$, $H_2^+$, $H_3^+$, $H^-$, $H_2^-$, $He^+$, $O^+$, $O_2^+$, $O_2^{+2}$, $O^-$, $O_2^-$, $O_2^{-2}$, $N^+$, $N_2^{+2}$, $N^-$, $N_2^{-2}$, ionized air, $C^+$, $CO^+$, $Ar^+$, $CH_3^+$, $C_2H_2^+$, higher ionization states of these ions, etc., ionized organic compounds, including ionized hydrocarbons of the formula $(C_nH_{2p+2})^{+m}$, where n is an integer of from 1 to 15, p is an integer of from 1 to 15, and m is an integer of from 1 to 5, and mixtures of these.

It must be recognized that many of these ions originate from materials which take part, or can take part in the combustion reaction. In one preferred embodiment of this invention one can accordingly inject into a combustion reaction a stream of at least one ion or neutral particle which is one of the reactants in the combustion reaction. Thus one may inject into the combustion reaction $H^+$, $O_2^+$ (including higher ionization states thereof), $O^+$ (including higher ionization states thereof), and ionized fuel molecules, including ionized hydrocarbon molecules.

Neutral particles which can be used in accordance with the present invention include the following: $H\cdot$, $H_2$, $H_3\cdot$, He, Ar, $O\cdot$, $C\cdot$, $N_2$, $CH_4$, $C_2H_2$, and any fuel molecules which can be driven into the combustion reaction. These include hydrocarbon compounds of formula $(C_nH_{2p+2})\cdot q$, where n is an integer of from 1 to 15, p is an integer of from 1 to 15, and q is 0 or an integer of from 1 to 5.

The particle beam of the present invention should be injected into the combustion reaction in a manner which will permit exposure of a maximum volume of reactants to the particle beam. To achieve this, the energy level of the particle beam, the current level of the particle beam, and the geometry of the combustion chamber can all be appropriately modified to maximize exposure of the combustion reaction to the particle beam.

It is known that the higher the energy of a beam, the further this beam will travel through a given atmosphere. Thus for two identical beams distinguished only by the fact that one beam is at a higher energy level, the higher energy beam will travel further through a given atmosphere.

It is also known that the density of the atmosphere influences particle beam travel. A particle beam having a specific energy will travel progressively shorter distances as the density of the atmosphere increases.

Thus, if the combustion reaction is taking place in a dense atmosphere and high penetration of this atmosphere is desired, a high energy beam should be used. By contrast, if the combustion reaction is taking place in a low density atmosphere and the particle beam is to travel only a short distance, then a lower energy beam is preferable.

It is also known that the amount of ionization in a gas is proportional to the current of the particle beam. Thus, if a high level of ionization is desired, a higher current should be used.

Adjustments which can be made include variation of the beam energy (voltage) in order to achieve an electron or particle beam range in the gas which maximizes the particle beam energy deposition in the gas while minimizing the electron beam energy deposition in the chamber walls. The optimal beam energy will therefore be a function of the gas density, gas pressure, and chamber dimensions. Particle beam current and duty cycle (or repetition rate) can be adjusted to achieve the optimal combustion enhancement or rate of chemical reaction One skilled in this art can vary these parameters to obtain optimum results.

The particle beam used in the present invention can be either injected into the combustion process to affect all of the reactants present in this combustion process, or, alternatively, the particle beam can be injected into one of the reactants prior to entry of this reactant into the combustion chamber. Thus, the particle beam of the present invention can be advantageously used to treat either the oxygen-containing component of the combustion process or the fuel being combusted.

The particle beams used in accordance with the present invention must possess an energy range of from $10^{-2}$ eV to $10^7$ eV. Preferably, these particle beams have an energy range of from 1 to $10^5$ eV, and most preferably an energy range of from 10 to $10^4$ eV. The current of these particle beams ranges from $10^{-7}$ Amperes to $10^7$ Amperes. Preferably a current range of from $10^{-3}$ Amperes to $10^4$ Amperes, and most preferably a current range of from 1 to $10^4$ Amperes is used.

When the particle beam is administered in cycles having a very short pulse length (or duty cycle) it is best to use currents in the higher range given above. Thus with pulses of less than 100 microseconds it is preferably to use currents in the range of from 1 to $10^7$ Amperes.

With intermediate length pulses, for example pulses having a pulse length of from 100 milliseconds to 100 microseconds, currents falling in the center of the current ranges is preferably used. With these intramediate length pulses, currents of from $10^{-2}$ to $10^2$ Amperes are preferably used.

With longer pulses or continuous administration of the particle beam, lower currents are advantageously used. Thus with pulses having a duration of from $10^0$ milliseconds to continuous pulses, it is advantageous to use currents of from $10^{-7}$ to $10^2$ Amperes.

The most advantageous use of current in this invention therefore depends on the pulse mode. The strength of the current used should be chosen as described above as a function of the nature of the pulse which can be short, long or continuous.

The particle beam driven reactions provided by the present invention occur at a more rapid reaction rate. The particle beam can also change the reaction chemistry, resulting in the production of different products from the reaction.

Although combustion reactions are frequently given simplistic explanations in which only the molar ratios of reactants and products are compared, in fact, combustion processes are very complicated. For example, an ethylene oxidation mechanism having over 100 individual reaction steps has been proposed. See J. A. Sell, "$CO_2$ and Excimer Laser Ignition of Ethylene/Air Mixtures," G.M. Research Report No. PH-1274, Oct. 30, 1985.

In contrast to earlier attempts, such as the one proposed by Matovich discussed above, which were concerned with directing heat onto a reaction using electromagnetic radiation, the inventor has discovered that injecting a particle beam into a combustion reaction affects the balance of various neutral and ionized species present in combustion reactions. The particle beam thus modifies and/or enhances the combustion reaction to provide a more efficient process. The present invention modifies the molecular nature of the combustion process, instead of applying more heat to the combustion process.

Previous methods used for driving chemical reactions were based on heating the reactants in a reaction vessel. Processes for promoting combustions reactions used burners, spark plugs alone, or high powered laser beams. In contrast to earlier attempts to modify reactions using electromagnetic radiation, instead of applying heat (thermal) radiation onto a combustion reaction, the present invention treats a combustion reaction with a particle beam. This particle beam affects the ionization, dissociation, etc. of the reactants and intermediates in a combustion process. The present invention thus modifies the nature of the combustion process.

The Matovich invention relies on thermal heating of the reactants whereas the present invention uses ionization, dissociation, free radical generation, increases in vibrational/rotational energy, and metastable states to increase the flame speed and reaction rate. The particle beams in the present invention include electrons as well as ions and neutral beams of numerous elements and molecules including (as discussed above), but not limited to: H, $H_2$, He, O, $O_2$, C, A, $C_xH_y$, and metal or catalytic ions or neutral molecules. Thus, an important distinction between this invention and Matovich is that, while Matovich's invention included nuclear radiation, it does not include atoms and molecules which may participate in the reaction as fuel, oxidant, or catalyst.

One advantage of using the particle beam provided by the present invention to drive the reaction relates in part to the fact that the large instaneous power of the particle beam increases the ionization, formation of radicals, dissociation, generation of metastable states, and increased vibrational energy in the reactants, thereby increasing the rate of reaction. The particle beam driven reaction provided by the present invention can be used to reduce certain types of pollution by changing the products of a given chemical reaction.

The present invention has applications in the chemical industry. It can be used to drive chemical reactions more rapidly or to drive chemical reactions which can not proceed under normal conditions. The present invention can also be used to increase the efficiency and reduce the pollution of fossil fuel fired combustion processes.

The chemical reactions which can be modified or enhanced in accordance with the present invention are many and varied. Combustion reactions are, of course, the oxidation of organic materials to produce various carbon oxides and water. For example, the combustion of ethylene in air and in an oxygen/argon mixture can be illustrated as follows:

stoichiometric combustion of ethylene ($C_2H_4$) in air:

$$C_2H_4 + 3O_2 + 3(3.76)N_2 \rightarrow 2CO_2 + 2H_2O + 11.28N_2$$

in argon + $O_2$ $$C_2H_4 + 3O_2 + 3(3.76)Ar \rightarrow 2CO_2 + 2H_2O + 11.28Ar$$

As shown by the above equations, ideally the combustion of organic compounds produce carbon dioxide and water. Incomplete combustion provides lower oxides of carbon, including carbon monoxide. Particularly inefficient combustion processes produce carbon black which evidences very inefficient combustion. The present invention addresses specifically this problem and makes any such combustion process occur more rapidly, especially with a lean fuel-air ratio, providing high fuel efficiency and reduced pollution.

The organic materials which can be burned in accordance with the present invention include all organic materials, including hydrocarbons, which are used, or which can potentially be used, as fuel materials. These materials can of course be present as gases, liquids, solids, or mixtures of these at standard atmospheric pressure and temperature. These include coal, diesel oil, kerosene, gasoline fractions, and lower hydrocarbons, e.g., $C_{1-15}$ hydrocarbons, thus including methane. Specific example of fuels which will work is this invention include natural gas, propane, ethylene, ethane, methane, butane, acetylene, other gases, as well as automobile fuels, jet fuels, electricity generator fuels, etc. Examples of applications of this invention include coal or natural gas fired electricity generating plants in which much less fuel would be used with a corresponding decrease in particulate emissions.

In some cases no spark plug is needed. For example in a diesel engine a spark plug is not required, so particle beam, e.g., electron beam, injection can be used by itself to improve the fuel economy and to reduce the particulate emissions.

The ratio of dioxygen to combustible organic material which can be used in accordance with the present invention can be varied widely. Particle beam injection permits more reliable combustion and faster flame speeds over a wider range of fuel-air mixtures than can be achieved with simple spark ignition. A faster flame speed is also achieved at stoichiometric fuel-air ratios.

Specific fuel-air ratios which can be used range from $\phi$ of 0.3 to 3, where the stoichiometric (or molar) ratio is defined as $\phi=1$. The best effect occurs with lean mixtures at $\phi=0.5$ to 0.6 although other lean mixtures up to stoichiometric also work very well. A primary advantage of the present invention is that the injection of a particle beam into a combustion reaction provides for reliable combustions of leaner mixtures of oxygen and fuels.

Figure 4:
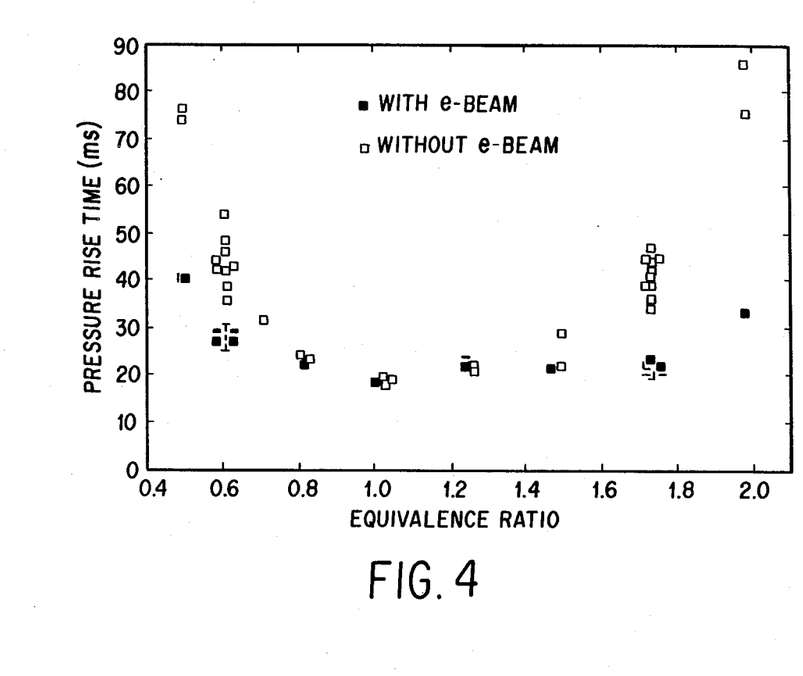
FIG. 4 illustrates pressure risetime (measured from time of spark to pressure peak) as a function of fuel-air equivalence ratio $\Phi$. Stoichiometric mix at $\Phi=1$ corresponds to 48 Torr $C_2H_4$ and 692 Torr air.

As illustrated in FIG. 4, with ethylene, the highest modification of the combustion reaction is observed in accordance with the present invention when either an excess of oxygen or an excess of combustible organic material is present in the combustion chamber. The present inventor has discovered however that this phenomena is only observable with ethylene. With other fuels, even a stoichometric mixture of oxygen and fuel provides the advantageous results of the present invention.

Figure 1:
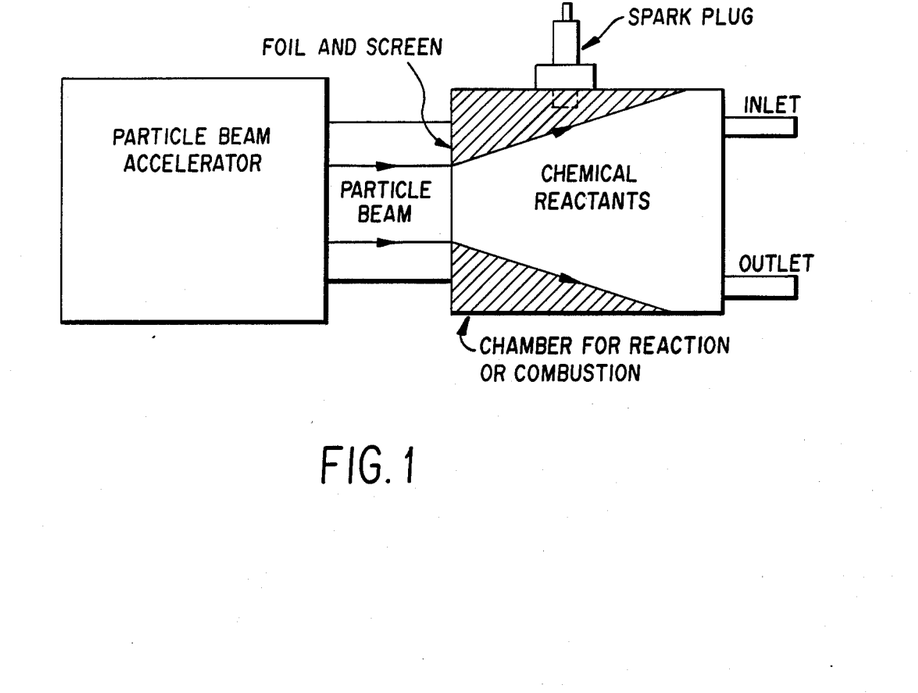
FIG. 1 illustrates an apparatus configuration for carrying out the present invention.

FIG. 1 schematically illustrates an apparatus which can be used to modify and/or enhance reactions in accordance with the present invention. As can be seen from this Figure, an electron beam, ion beam or the neutral particle beam generator is situated adjacent a combustion chamber. The particle beam produced by the generator may be passed through a screen or foil and directed into the reactor chamber, where it modifies and/or promotes the combustion reaction in accordance with the invention.

In a commercial device for energy production the combustion reaction either moves a piston or heats a working fluid which surrounds the vessel. These are not shown in the schematic illustration of FIG. 1. In a combustion plant or chemical reactor a means of regulating the flow of reactants into the chamber is provided. The type of accelerator used depends upon the application.

A continuous or repetitively pulsed particle beam accelerator, e.g., an electron beam accelerator, can be used in the case of a continuous process, such as burning of fossil fuels in an electric utility plant. Such an accelerator is made of a high voltage rectifier circuit which can be either full wave rectified or half wave rectified.

In the case of an internal combustion engine preferably a repetitively pulsed particle beam, e.g., an electron beam, is injected at a given time during each cycle in which ignition and burning of the fuel takes place. Such an electron beam could be generated by a capacitive discharge system, a Marx generator circuit, pulse line generator, or an inductive discharge system. These types of electron beam generators are commercially available from a number of companies, including Hewlett Packard Co. of McMinnville, Oreg., or Pulse Sciences Inc. of San Leandro, Calif., and others. It must be noted however, that where convenient, a continuous particle beam can also be used in this application of the invention.

A number of existing technologies can be employed for the generation and acceleration of ion and neutral beams. Ion sources could consist of duoplasmatrons, duopigatrons, electron cyclotron ion sources, or radio frequency sources. The high voltage accelerator for ion beam acceleration could be a Van De Graaff, Marx generator, Cockroft-Walton (ladder circuit), or high voltage rectifier.

When combustion reactions are being treated in accordance with the present invention, a spark plug can be installed in the combustion chamber to initiate the combustion reaction.

In an advantageous embodiment of this invention, such a spark plug may be designed to include both the means for initiating the combustion reaction and for subjecting the combustion reaction to the particle beam. Such a plug is referred to as an injector plug/spark plug.

The operation of simple spark plugs by themselves is well known. See for example U.S. Pat. No. 4,514,656. Spark plugs, in operation, have different characteristics which are matched to the operating characteristics of the internal combustion engine, and used to which the engine is put—for example whether it is used to drive an automotive vehicle of the passenger car type, a motorcycle, truck, or if the combustion engine is used for small applications, such as chain saw or a lawnmower.

The present invention provides an injector plug/spark plug which has the dual function of initiating and maintaining the combustion reaction in accordance with well known spark plug functions, and additionally emits a particle beam into the combustion reaction to advantageously enhance and/or modify the combustion process. This spark plug/injector plug can be designed to increase electron emission. It can be designed to have an electrode (cathode) containing a material having a low work function. Such low work function materials include $LaB_6$, barium oxide, calcium oxide or strontium oxide. The electrode of the injector plug/spark plug, can alternatively be coated with $LaB_6$, barium oxide, calcium oxide or strontium oxide, or a combination of these.

If the electrode contains the low work function material, it contains this material in an amount of 1 to 20% by weight, preferably 5 to 15% by weight. If the electrode is coated, the thickness of the coat is from 1 micron to 1 mm, preferably 10 microns to 0.1 mm.

In still another preferred embodiment of this invention, this injector plug/spark plug is designed to enhance heating of the plug to still further enhance electron emission into the combustion process.

The components of the injector plug/spark plug, aside from the low work function materials, can be well known materials usable in making spark plugs.

Figure 6:
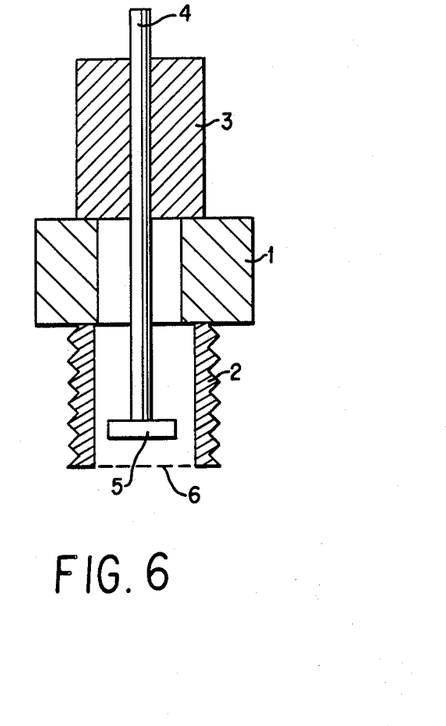
FIG. 6, provides a schematic illustration of an electron beam injector plug used in accordance with the invention.

As shown in FIG. 6, an electron beam injector plugged in accordance with the present invention comprises a metal housing (1), a means for securing the housing in an engine block (2), an insulating body (3) secured in the metal housing and formed with a central opening. This electron beam injector plug further comprises a high voltage electrode (4) centrally extending through the opening in the insulating body, a cathode means (5) in communication with the high voltage electrode means (4), and an anode screen or foil (6) adjacent to the high voltage cathode means.

Two spark plugs may also be used with this invention; a normal spark plug and a particle beam emitting plug. An electron beam injector spark plug is illustrated in FIGS. 6. It comprises: (a) a cathode (which may be based on thermionic emission, field emission or explosive emission), and (b) an anode foil or screen through which the electron beam passes into the reaction chamber. The foil may separate a vacuum in the cathode region from the reactants in the chamber. A voltage is applied to the cathode either continuously or in a pulsed mode. This causes an electron beam to be injected through the foil or screen into the reaction or combustion chamber.

The cathode of the injector plug of this invention is made of a material having a low work function. This includes $LaB_6$ or a tungsten matrix coated with $LaB_6$ barium oxide, calcium oxide, or strontium oxide. The anode foil can be made of tungsten, tantalum, steel, titanium or a metallized plastic foil. The screen is made of the same material as the anode.

The insulator can be made of a material known in this art which possesses characteristics suitable to permit it to function as an insulator at high temperatures. For example, alumina can be used. The metal housing can be made of steel, and the high voltage electrode can be made of copper or brass. The metal housing and the high voltage electrode are made of materials known in this art.

Other features of the invention will become apparent in the course of the following descriptions of exemplary embodiments which are given for illustration of the invention and are not intended to be limiting thereof.

In the experiment reported here, data is presented in which injection of a high current electron beam[10] has been demonstrated to dramatically alter the rate of pressure rise, flame speed, and spectroscopic emission in the combustion of both lean and rich ethylene-air mixtures.

Figure 2:
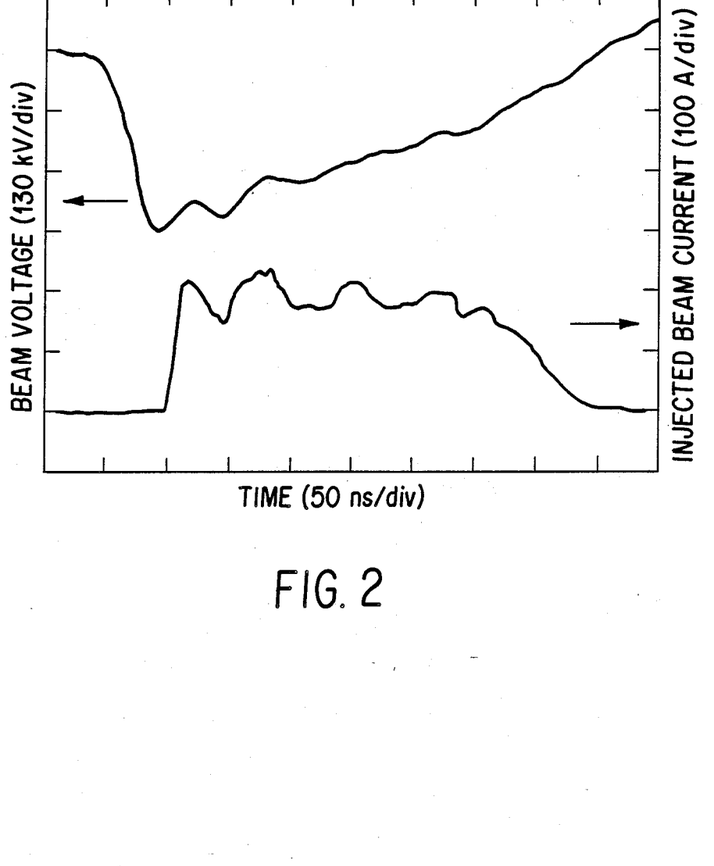
FIG. 2 provides cathode voltage and injected beam current for a typical febetron electron beam accelerator pulse.
Figure 7:
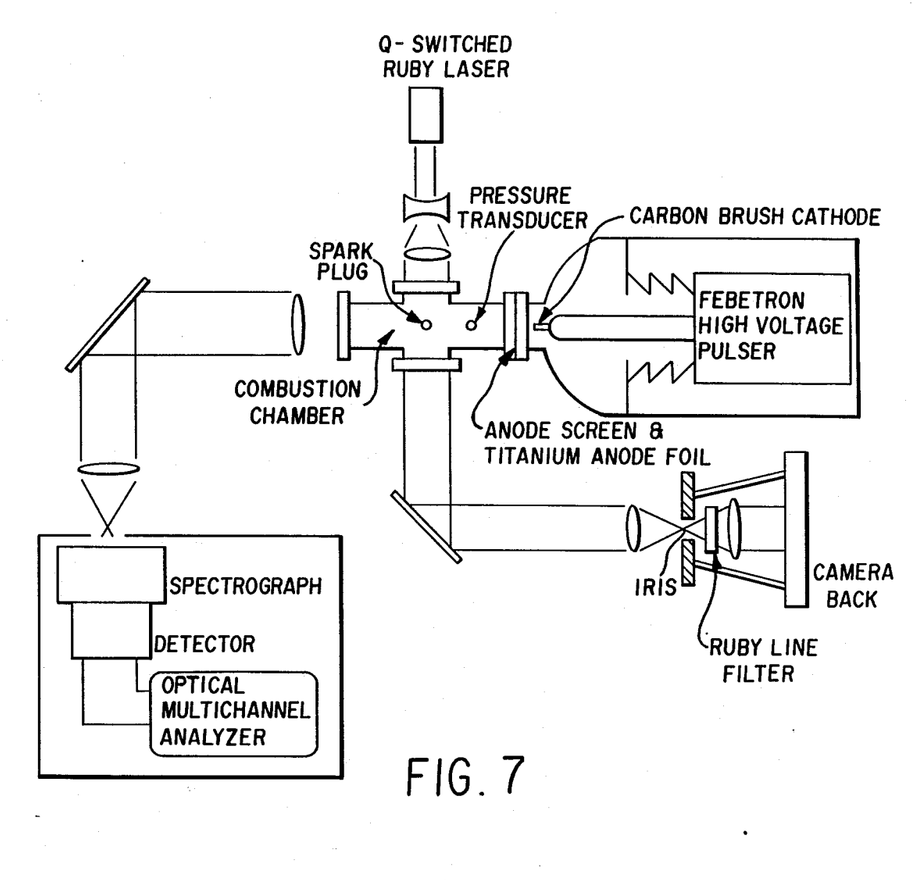
FIG. 7 illustrates one of the experimental apparatus configuration used by the inventor.

The experimental configuration is depicted in FIGS. 7 and 2. The electron beam is generated by a field emission cathode[11] on a Febetron generator with peak parameters: $V_p = 400$ kV, $I_P = 1$ kA, and full width pulselength = 300 ns. A perforated metal screen supports the 0.025 mm thick Ti anode foil which is evacuated on the cathode side and undergoes a pressure pulse of several atmospheres from the combustion in the chamber on the opposite side. The anode foil and metal screen reduce the injected current to about 200 A. The interaction chamber is an aluminum cross of circular cross section with an inside diameter of 8.26 cm and a length of 22 cm giving a chamber volume of 1.19 liter. Quartz windows are located at the sides and end of the chamber. A spark plug and piezoelectric pressure transducer are located at the top of the chamber.

Several diagnostics were used to monitor the combustion process. Chamber pressure was measured with a pressure transducer and preamplifier fed into an oscilloscope. Line emission from the 309 nm OH line was measured with a linepass filter coupled to a photomultiplier tube which was oriented transverse to the electron beam. For flame front measurements, schlieren photography with 2-dimensional resolution was performed transverse to the direction of the electron beam injection by means of a pulsed ruby laser diagnostic described in Refs. 12 and 13. Also, emission spectra were observed both during and after the spark by a 0.275 m spectrograph coupled to a gated optical multichannel analyzer.

The experimental procedure was as follows. Fuel and air were mixed for 30 seconds by a small fan located inside the chamber. This mixture was ignited by a conventional spark ignition system; after a 1 msec delay, the electron beam was injected. This permitted a direct comparison of the modification of combustion parameters by the electron beam.

It should be noted that direct ignition of the mixture by the electron beam did not occur in these experiments. This is undoubtedly due to the low energy density deposited into the gas by the electrons. The pressure rise was undetectable ($<1$ Torr) when the electron beam was injected into an unignited mixture. Thus the electron beam caused negligible temperature increase in the mixture.

Figure 3:
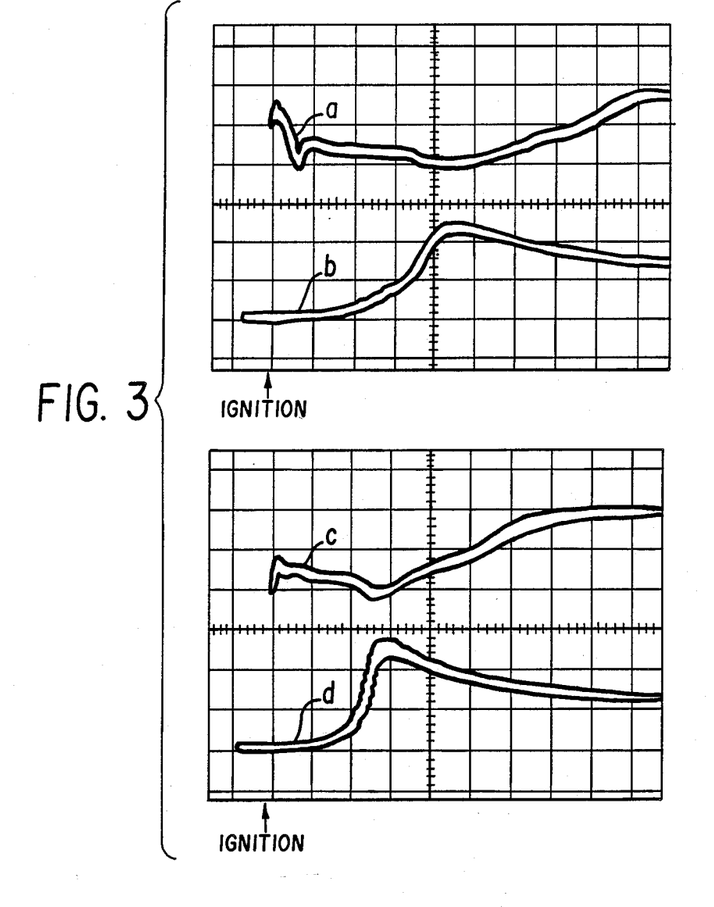
FIG. 3 provides combustion data for lean mixture of 30 Torr $C_2H_4$ and 710 Torr air (equivalence ratio $\Phi=0.6$). Upper photo - Oscilloscope traces for combustion with spark ignition alone:
(a) OH line emission intensity at 309 nm;
(b) Pressure transducer signal (2 atm/$_{div}$);
Time scale: 10 ms/$_{div}$.
Lower photo - Oscilloscope traces for combustion with electron beam injection 1 ms after the spark.
(c) OH line emission intensity at 309 nm;
(d) Pressure transducer signal (2 atm/$_{div}$)
Time scale: 10 ms/$_{div}$.

FIG. 3 presents pressure signals and OH-emission data for combustion of a lean mixture with versus without electron beam injection. These measurements indicate that the combustion process was more rapid with electron beam injection. FIG. 4 presents a plot of pressure risetime versus equivalence ratio, (where $\Phi = 1$ corresponds to the stoichiometric fuel-air ratio of 48 Torr $C_2H_4$ and 692 Torr air). The data show about a 50% decrease in pressure risetime as a result of electron beam injection into lean and rich mixtures, but very little effect near the stoichiometric fuel-air ratio. For the cases where the pressure risetime was reduced, the OH-emission risetime and decay-time were also reduced and the magnitude of the peak pressure was increased by 10% to 20%. The pressure risetime data was also more reproducible in these cases. The increase in combustion rate was observable with electron beam injection as early as 15 ms before the spark ignition and as late as 15 ms after the spark ignition. This more rapid combustion is similar to that observed in laser[8,9] and plasma jet[6,7] ignition. Electron beam injection increased the level of pressure oscillations measured by a microphone (at 1-2 kHz) during the pressure-rise and caused a loud squeal on these shots.

Figure 5:
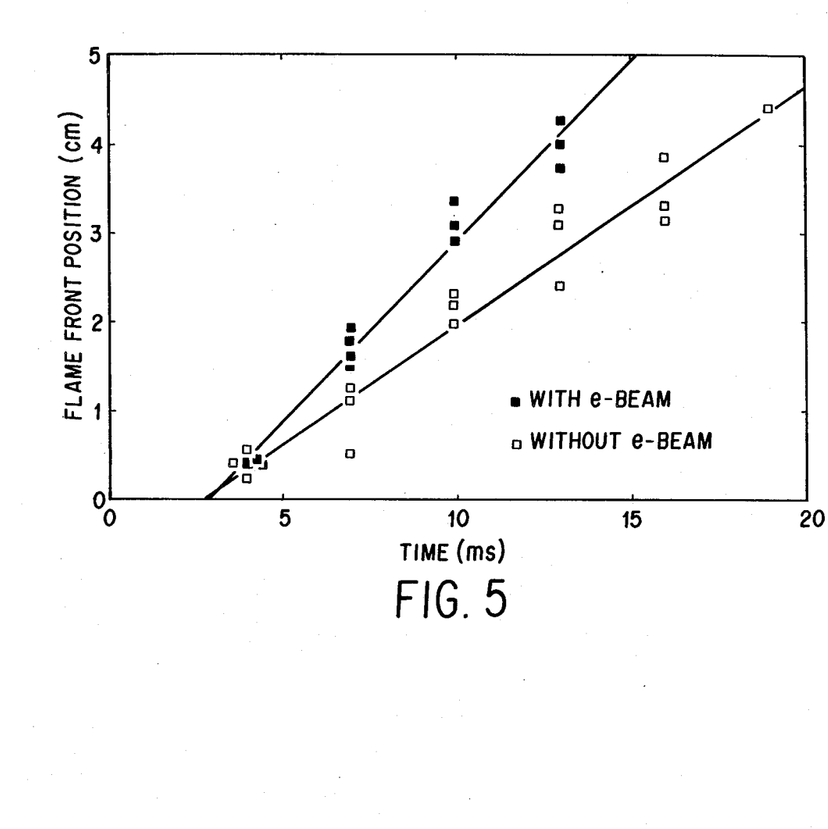
FIG. 5 illustrates results obtained for flame front position transverse to electron beam direction, measured with laser schlieren photography. Data is for a lean mixture with 30 Torr $C_2H_4$ and 710 Torr air ($\Phi=0.6$). From the slope of the lines, the flame speed was determined to be 403 cm/$_s$ with electron beam injection, and 268 cm/$_s$ without electron beam injection.

Laminar flame propagation was observed using schlieren photographs of the flame front at various times after ignition. In FIG. 5, the distance between the flame front and the spark plug tip is shown as a function of time for a lean mixture with versus without electron beam injection. For this mixture, the propagation velocity of the flame front was clearly increased by electron beam injection. Electron beam injection appears to enhance the flame speed by up to 50% for lean mixtures (FIG. 5) and 40% for rich mixtures (not shown). Even larger increases in flame speed have been measured fr electron beam injection into other gases, e.g., methane, ethane, propane, butane, even at stoichiometric ratios In shots with electron beam injection the flame front was slightly elongated transverse to the beam direction compared to nearly spherical flame expansion without the electron beam. This suggests that the flame was propagating more rapidly in the region of the electron beam axis, where the electron beam current density was highest.

In conclusion, the injection of a 300 ns electron pressure, flame speed, and spectroscopic emission data over timescales exceeding 10 ms.

PUBLICATIONS CITED IN THE TEXT

1. Proceedings of the International Conference on Fuel-Air Explosions, edited by J. H. S. Lee and C. M. Guirao.
2. R. Hickling, General Motors Research Report EM-478 Sept. 30, 1980.
3. T. M. Sloane and J. W. Ratcliffe, General Motors Research Laboratories Publication GMR-4404, July 11, 1983.
4. H. C. Jaggers and A. von Engel, Combustion and Flame, 16, 275 (1971).
5. C. S. Maclatchy, R. M. Clements, and P. R. Smy, Combustion and Flame, 45, 161 (1982).
6. P. L. Pitt and R. M. Clements, Combustion Science and Technology, 30, 327 (1983).
7. P. L. Pitt, J. D. Ridley, and R. M. Clements, Combustion Science and Technology, 35 277 (1984).
8. R. Hickling and W. R. Smith, Society of Automotive Engineers Paper No. 740114.
9. J. A. Sell, General Motors Research Report GMR-5247, Oct. 30, 1985.
11. M. L. Brake, R. M. Gilgenbach, R. F. Lucey, Jr., K. Pearce and T. Repetti, Appl. Phys. Lett., 49, 696 (1986).
12. L. D. Horton and R. M. Gilgenbach, Phys. Fluids, 25, 1702 (1982).
13. L. D. Horton and R. M. Gilgenbach, Appl. Phys. Lett., 43, 1010 (1983).
14. D. W. Koopman and K. A. Saum, J. Appl. Phys., 44, 5328 (1973).

Obviously, numerous modifications and variations of the present invention are possible in light of the above teachings. It is therefore to be understood that within the scope of the appended claims, the invention may be practiced otherwise than as specifically described herein.

What is claimed is:

1. A process for modifying or enhancing a combustion reaction, comprising subjecting an organic material undergoing a combustion reaction, either immediately prior to or during the combustion process, to pulsed irradiation with an electron beam, an ion beam, a neutral particle beam, or a combination of these, wherein each beam has an energy of from $10^{-2}$ eV to $10^7$ eV and a current of from $10^{-7}$ Amperes to $10^{-7}$ Amperes.
2. The process of claim 1, wherein the beam has an energy of from 1 to $10^5$ eV.
3. The process of claim 1, wherein the beam has an energy of from 10 to $10^4$ eV.
4. The process of claim 1, wherein the beam has a current of from $10^{-3}$ to $10^4$ Amperes.
5. The process of claim 1, wherein the beam has a current of from 1 to $10^4$ Amperes.
6. The process of claim 1, wherein the beam is an electron beam.
7. The process of claim 1, wherein the beam is an ion beam.
8. The process of claim 7, wherein the ion beam is a beam of $H^+$, $H_2^+$, $H_3^+$, $H_2^{+2}$, $He^+$, $Ar^+$, $N^+$, $N_2^+$, $N_2^{+2}$, $O^+$, $O_2^+$, $O_2^{+2}$, $C^+$, $CO^+$, ionized fuel, $H^-$, $H_2^-$, $H_3^-$, $O^-$, $O_2^-$, $O_2^{-2}$, $N^-$, $N_2^-$ or $N_2^{-2}$.
9. The process of claim 8, wherein the ionized fuel comprises $(C_nH_{2p+2})^{+m}$ or $(C_nH_{2p+2})^{-m}$, where n is an integer of from 1 to 15, p is an integer of from 1 to 15, and m is an integer of from 1 to 5.
10. The process of claim 9, wherein the ionized fuel is $(C_nH_{2p+2})^{+m}$.
11. The process of claim 9, wherein the ionized fuel is $(C_nH_{2p+2})^{-m}$.
12. The process of claim 1, wherein the beam is a particle beam.
13. The process of claim 12, wherein the particle beam is a beam of H·, H$_2$·, H$_3$·, He, Ar, O·, C·, N· or a fuel molecule.
14. The process of claim 13, wherein the fuel molecule comprises a compound of the formula $$(C_nH_{2p+2})^{+m} \text{ or } (C_nH_{2p+2})^{-m}$$

wherein:
n is an integer of from 1 to 15;
p is an integer of from 1 to 15; and
m is an integer of from 1 to 5.
15. The process of claim 1, wherein the organic material undergoing a combustion reaction comprises a fuel or a pollutant.
16. The process of claim 15, wherein the organic material undergoing a combustion reaction is a fuel.
17. The process of claim 1, wherein said organic material is coal, diesel oil, kerosene, a gasoline fraction, or a lower hydrocarbon.
18. The process of claim 1, wherein said organic material is coal.
19. The process of claim 1, wherein said pulsed irradiation comprises pulse having a duration of less than 100 μsec.
20. The process of claim 1, wherein said pulsed irradiation comprises pulse having a length of from 100 msec to 100 μsec.
21. The process of claim 1, wherein said pulsed irradiation comprises pulses having a duration of at least 100 msec.

* * * * *